Aug. 19, 1958
C. P. WEAVER
2,847,814
SIDE DELIVERY RAKE
Filed Jan. 4, 1954
3 Sheets-Sheet 2
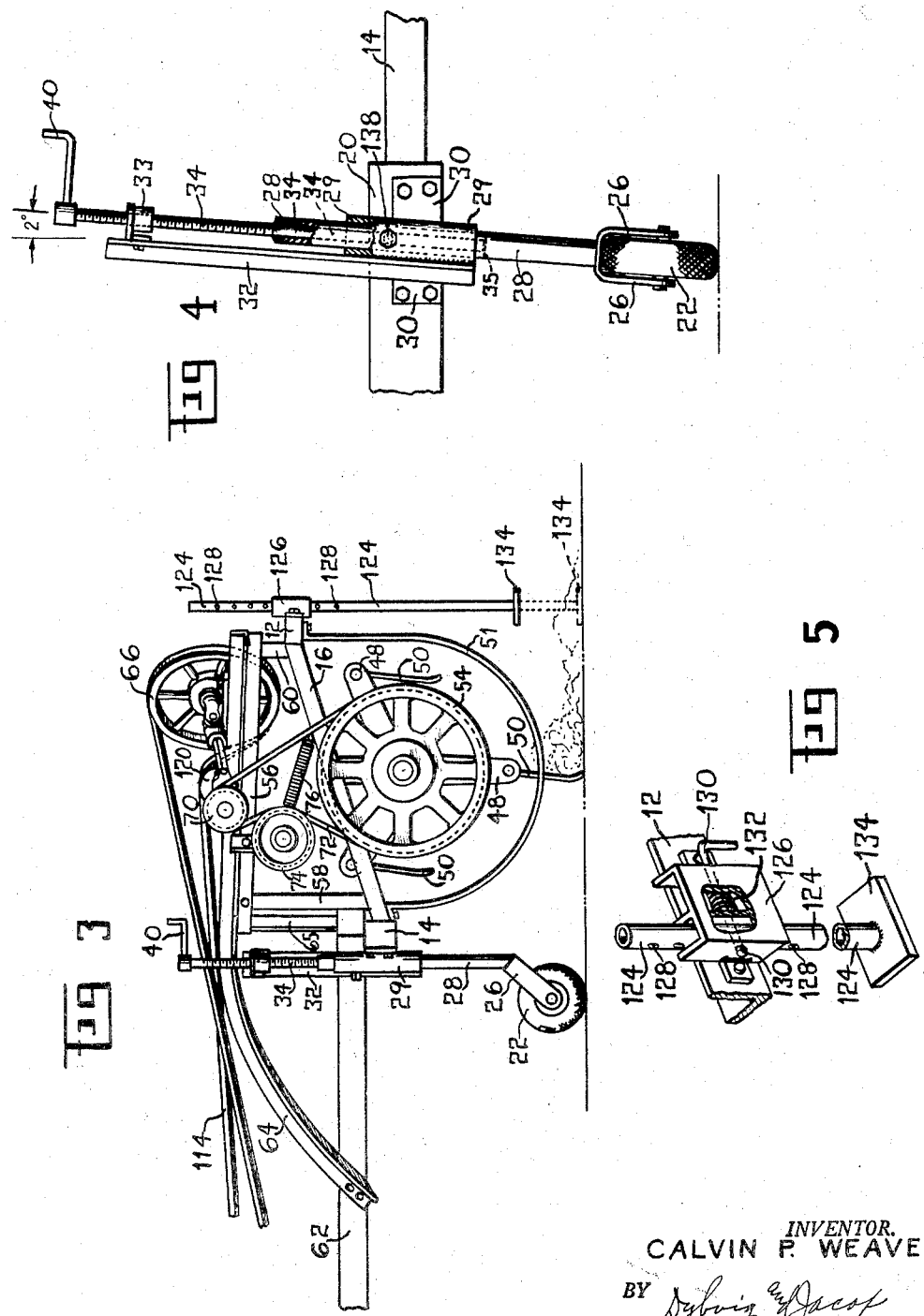
INVENTOR.
CALVIN P. WEAVER
BY
HIS ATTORNEYS

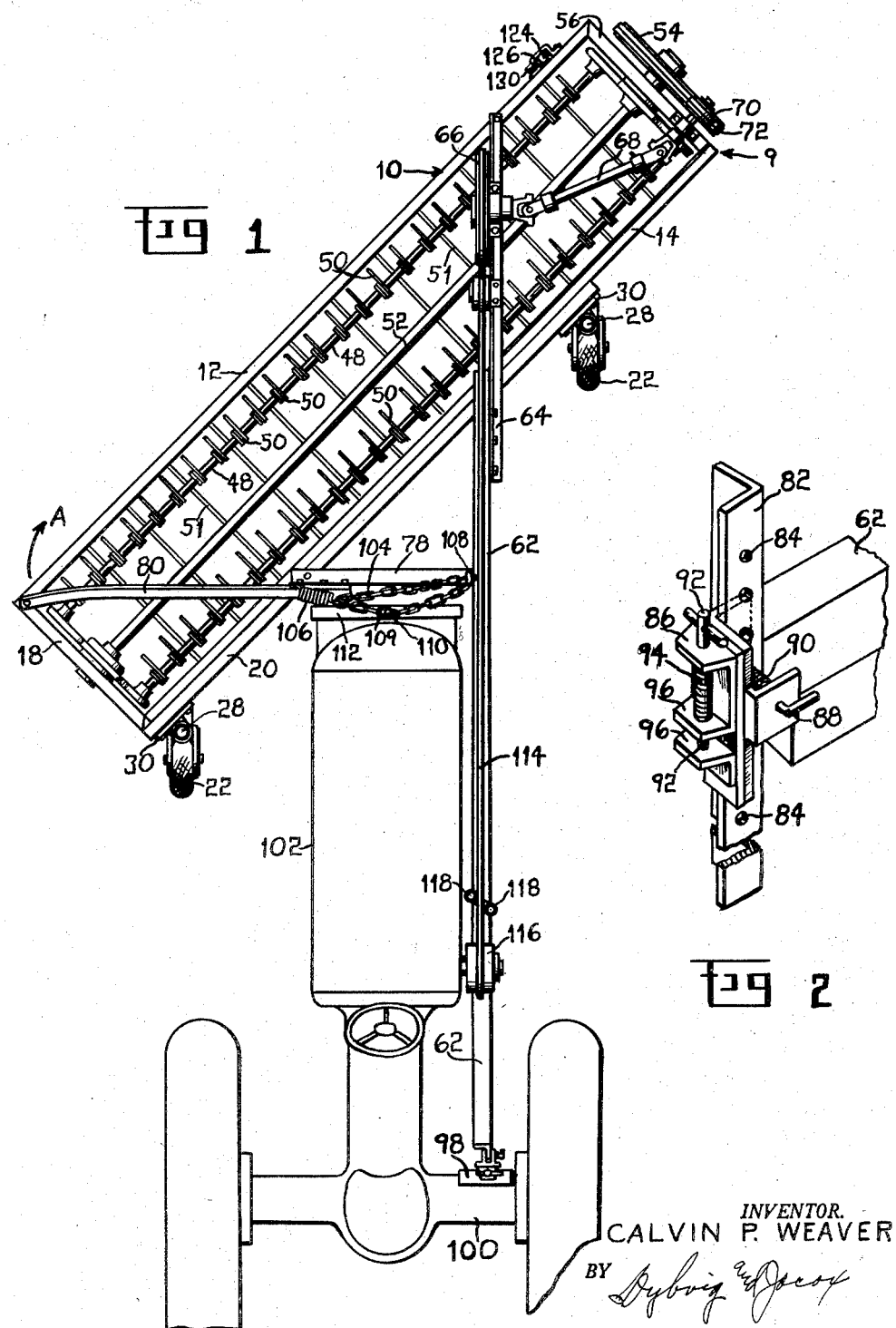

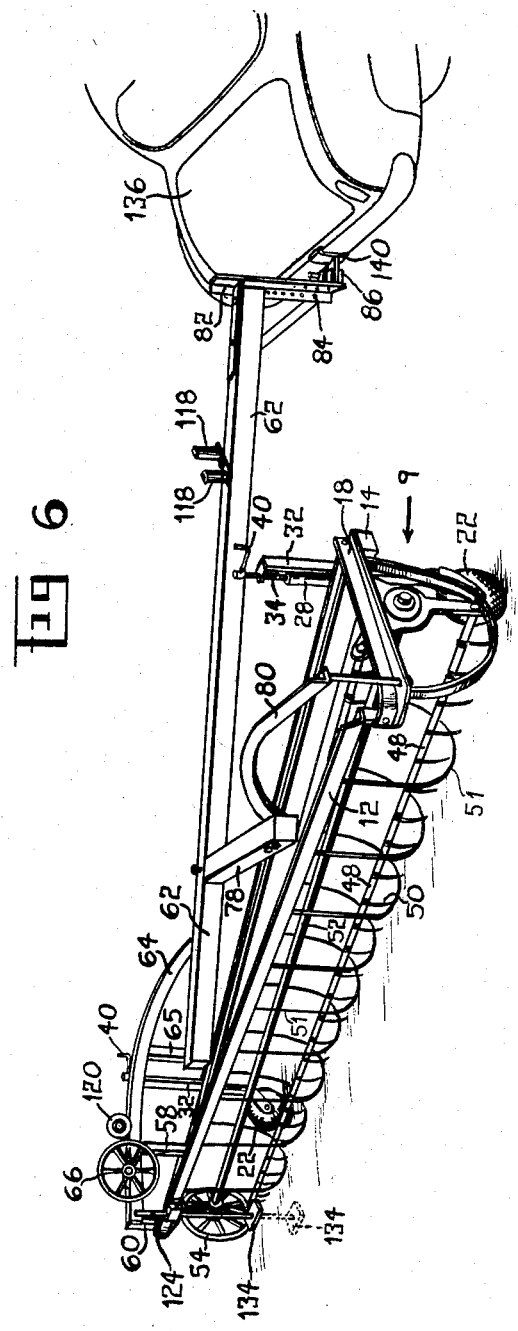

United States Patent Office 2,847,814
Patented Aug. 19, 1958

2,847,814

SIDE DELIVERY RAKE

Calvin P. Weaver, Tipp City, Ohio

Application January 4, 1954, Serial No. 402,065

6 Claims. (Cl. 56—27)

This invention relates to a side delivery rake. It relates more particularly to a push type of side delivery rake which is adapted to be used with a farm tractor.

A push type of side delivery rake has several advantages over the type of rake which is pulled behind propelling means. The push type of rake enables the operator to closely observe the operation of the rake while guiding the propelling means and none of the raked material is crushed or bruised by the propelling means. The push type of rake also permits the pulling of other types of machinery behind the propelling means while the raking operation is being performed. However, it has been found that the use of the conventional push type of side delivery rake it is necessary to firmly and rigidly secure the rake to the tractor which propels it. Many kinds of push type side delivery rakes are only adapted to be used with a particular design of tractor. It is difficult to attach or to remove the conventional push type of rake from a tractor.

Hence, an object of this invention is to provide a side delivery rake of the push type which is easily and quickly attachable to a tractor or detachable therefrom, the rake being guided and operated by the tractor and not rigidly attached thereto.

Another object of this invention is to provide a push type of rake which is easily attachable to any conventional farm tractor.

Another object of this invention is to provide a push type side delivery rake which may be easily and quickly attached to the rear portion of an automobile or the like so that the rake may be trailed therebehind.

Another object of this invention is to provide means by which a push type of side delivery rake may be adjustably attached to a tractor so that the rake may be employed in various applications.

Another object of this invention is to provide a side delivery rake which is so easily detached, attached and manipulated that such procedure can be quickly and easily performed by one person.

Another object of this invention is to provide a novel means of attachment of caster wheels in supporting engagement with a push type side delivery rake so that the rake need not be secured to the tractor and need only be freely connected to the tractor and guided thereby.

Another object of this invention is to provide a freely connected or "free floating" push type side delivery rake which is provided with a raking means which is operable by the propelling means through a flexible connection thereto.

Other objects and advantages reside in the construction of parts, the combination thereof and the mode of operation, as will become more apparent from the following description.

In the drawings,

Figure 1 is a top plan view showing the side delivery rake of this invention attached to a tractor.

Figure 2 is a fragmentary perspective view, with parts shown in section, disclosing the means for attachment of the side delivery rake to a propelling means.

Figure 3 is an end elevational view of the side delivery rake of this invention.

Figure 4 is an enlarged rear elevational view partly in section of a supporting wheel mechanism of the side delivery rake of this invention.

Figure 5 is a perspective view with parts broken away disclosing the support leg adjustably attached to the side delivery rake of this invention for use when the rake is detached and stationary.

Figure 6 is a perspective view showing the side delivery rake of this invention attached to the rear portion of an automobile for transferring the side delivery rake from one location to another.

Referring to the drawings in detail, a side delivery rake 9 of this invention comprises a frame 10 provided with side members 12 and 14. The side members 12 and 14 are joined by a pair of end members 16 and 18. Longitudinally attached to the side member 14 in abutting relation thereto is an elongate mounting block 20. At each end of the mounting block 20 is a caster wheel 22. Each of the caster wheels 22 is attached by means of a bifurcated arm 26 to a hollow cylindrical support rod 28 which is rotatably and slidably disposed within a sleeve 29 of a support bracket 30. Each of the sleeves 29 is inclined with respect to the support bracket 30, thus causing the support rod 28 to be inclined, which results in an inclination of the caster wheels 22, as best shown in Figure 4. The support rods 28 are mounted substantially in parallel relation one to the other. Each of the support rods 28 is disposed in a vertical plane parallel to the side member 14 and the support rods 28 are inclined from the vertical in order to cause the wheels 22 to be inclined with respect to the ground for a reason which is discussed below.

Attached to each bracket 30 and extending upwardly therefrom is a channel 32. To each channel 32 at the upper end thereof is secured a nut 33. Each of the support rods 28 is vertically adjustable with respect to the side member 14 of the frame 10 by means of a jack screw 34. Each of the jack screws 34 is threadedly attached to one of the nuts 33 and is rotatably positioned within its respective support rod 28. The bottom end of each jack screw 34 is seated upon an abutment 35 within each support rod 28. A crank 40 is attached to each jack screw 34 for rotation thereof and such rotative movement results in adjustment of the height of the frame 10 with respect to the ground upon which the caster wheel 22 is positioned. Threaded adjustment of either one of the jack screws 34 also adjusts the angle of inclination of the support rods 28 as the angular position of the side member 14 with respect to the ground is changed.

As best shown in Figure 3, the caster wheels 22 are adapted to swivel within the sleeves 29.

Rotatably supported by the frame 10 in a conventional manner at opposite ends thereof is a reel 48 provided with teeth 50. Arcuately formed strippers 51 are rigidly attached at each end thereof to the lower side of the frame 10 and cooperate with the teeth 50, as clearly shown in Figures 1, 3 and 6. A drive shaft 52 of the reel 48 has attached at one end thereof a drive sheave 54. Mounted above the end member 16 of the frame 10 is a cross member 56 supported by vertical struts 58 and 60 which are attached to the end member 16.

A push bar or guide bar 62 has one end thereof attached to the side member 14 of the frame 10 and extends angularly therefrom. Attached to the push bar 62 adjacent the side member 14 is an extension bar 64 which is arcuate and disposed over the frame 10, and the midsection thereof is rigidly joined to the side member 14 by means of a strut 65 and the end thereof is rigidly joined to the side member 12.

As shown in Figures 1 and 3, a belt pulley 66 is rotatably supported by the extension bar 64. A double universal drive coupling 68 joins the belt pulley 66 and a transfer pulley 70 for transmission of power from the the belt pulley 66 to the drive sheave 54 through a belt 72. An idler pulley 74 is supported by the cross member 56 and is biased by a spring 76.

Rigidly attached to the push bar or guide bar 62 and substantitally normal thereto is a connector bar 78 which is also firmly attached to the side member 14 of the frame 10. An extension bar 80 is rigidly attached to the connector bar 78 adjacent the side member 14 of the frame 10 and extends arcuately over the reel 48 and is secured to the frame 10 adjacent the juncture of the side member 12 and the end member 18.

As best shown in Figure 2, at the end of the push bar 62, opposite the frame 10, is rigidly attached a normally extending angle 82 provided with a plurality of apertures 84.

Adjustably attached to the angle 82 is a clevis 86, as shown in Figures 1 and 2. The clevis 86 is provided with a horizontally disposed pin 88 adapted to be positioned in one of the apertures 84 of the angle 82 for vertical adjustment of the clevis 86 upon the angle 82. A spring 90 urges the pin 88 through the aperture 84 with which the pin 88 is aligned. A pin 92 is disposed substantially parallel to the angle 82 and extends through a pair of plates 96. The pin 92 is adapted to be inserted through an aperture in the connector plate 98 for pivotal attachment of the clevis 86 to the connector plate 98.

Due to the fact that the clevis 86 is vertically adjustable with respect to the angle 82, the height of the end of the push bar 62 may be adjusted as it is attached to the connector plate 98. This adjustment of the height of the end of the push bar 62 is provided as a means of adjusting the angular relationship of the frame 10 with respect to the ground as the side members 12 and 14 remain substantially horizontal.

The only other connection to the tractor 102 is by means of a chain 104, the two ends of which are attached to one end of a helical spring 106. The other end of the spring 106 is attached to the extension bar 80. The chain 104 is looped through an apertured bracket 108 attached to the push bar 62 adjacent the connector bar 78. A link 109 of the chain 104 is loosely hooked over a vertical pin 110 mounted upon a bracket 112 attached to the front end of the tractor 102.

As discussed above, and best shown in Figure 4, the caster wheels 22 are mounted upon the side member 14 of the frame 10 angularly so that when the side member 14 is horizontal, the caster wheels 22 are positioned upon the ground at an inclined angle. As a result of this inclination of the pivotally mounted caster wheels 22 at an angle of approximately two degrees from the vertical, the frame 10 of the rake 9 tends to rotate clockwise as it is being pushed forwardly by the tractor 102. In other words, the left side of the rake 9 tends to move forwardly and away from the tractor 102, as indicated by arrows A in Figure 1, as the rake 9 is being pushed by the tractor 102. An angle of two degrees is shown in Figure 4 indicating the inclination of the wheels 22 with respect to the vertical; however, any small angle of inclination in the order of one to ten degrees has been found satisfactory for the purpose intended. No support or brace from the frame 10 to the left side of the tractor 102 is used. The push rod 62 acts as a guide means for the rake 9.

The loose connection of the chain 104 through the apertured bracket 108 and the connection through the spring 106 act as additional guide means for the rake. The rake travels freely over the ground and is guided by the tractor through its pivotal and flexible attachment thereto. The rake remains a given distance from the ground and assumes an elevation from the ground substantially independent of the height or position of the tractor 102. As the tractor 102 pushes the rake 9 over rough or rolling ground, the rake remains at the initially adjusted distance from the ground.

The reel 48 of the rake 9 is rotatably operated by means of a belt 114 driven by a belt wheel 116 of the tractor 102. The belt 114 also operatively engages the belt pulley 66 and is guided through a pair of vertically disposed guide rollers 118 rotatably supported upon the push bar 62. The belt 114 also travels over an idler pulley 120.

When it is desired to attach the side delivery rake 9 of this invention to a tractor or to detach the rake 9 therefrom, the procedure can easily and quickly be accomplished by one person. All that is necessary in detaching the rake 9 from the tractor 102 is to remove the belt 114, unhook the chain 104 from the pin 110, and lift the pin 92 to remove the clevis 86 from engagement with the angle 97.

As best shown in Figures 3 and 5, a support leg 124 is slidably mounted in a support block 126 which is attached to the side portion 12 of the frame 10. The leg 124 is provided with a plurality of apertures 128 adapted to receive a pin 130 biased by a spring 132 for vertical adjustment of the leg 124. At the lower end of the leg 124 is a base 134. When the rake 9 is detached from a tractor, the leg 124 may be used to assist in supporting the rake while the rake is stationary. The leg 124 may be adjustably lowered within the support block 126 so that the base 134 engages the ground.

The end of the push bar 62 may be attached to an automobile, such as automobile 136 shown in Figure 6, so that the rake 9 may be trailed behind the automobile 136. When the rake 9 is attached to an automobile for trailing, the screw rods 34 are adjustably rotated so that the support rods 28 are positioned vertically and the wheels 22 are vertical. It is understood that when the wheels 22 are vertical, the sideframe members 12 and 14 of the frame 10 are horizontally inclined. After the adjustment of the wheels 22 to the vertical position, one of the support rods 28 is locked against rotation with respect to its guide sleeve 29 by means of a locking stud 138 which is threadedly inserted through the sleeve 29 and abuts the support rod 28. One of the support rods 28 is thus locked, so that it cannot swivel and the wheels 22 travel in a straight line as the rake 9 is trailed behind an automobile. The clevis 86 is adjusted to the height of a trailer hitch 140 of the automobile 136 by means of the pin 88 as the clevis 86 is coupled to the trailer hitch 140.

Thus, the side delivery rake of this invention may be moved over the highways swiftly and easily to another location. The rake can be quickly and easily attached to any conventional tractor at its new location.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a push type side delivery rake for operation by a tractor and for pulling behind an automobile during transfer of said side delivery rake comprising an elongate frame provided with a pair of side members, rotatable raking means supported by the frame, a pair of caster wheels attached to one of the side members of the frame, a pair of extension bars, each extension bar extending over the frame and being attached to both side members thereof, each of the extension bars being angularly disposed with respect to the side members, the extension bars being substantially normal one to the other, one of said extension bars having an end thereof provided with means for adjustable attachment of said extension bar to the rearward portion of a tractor and to the rearward portion of an automobile, and resilient means for attachment between the forward portion of a tractor and one of the extension bars.

2. In a "free floating" push type side delivery rake for operation in front of a propelling vehicle and for pulling behind a vehicle during transfer of said side delivery rake, comprising an elongate rectangularly shaped frame member having a pair of substantially horizontal side portions, rotatable raking means supported by the frame member, a pair of support rods rotatably attached to one of the side portions of the frame and angularly disposed thereto in spaced apart parallel relation, a pair of caster wheels, there being one caster wheel rotatably attached to each of the support rods for support thereof, a guide bar attached to the side portions of the frame member and extending angularly therefrom, and an extension bar attached to the guide bar normal thereto and attached to each of the side portions of the frame member, said guide bar being pivotally attachable to the rear portion of a vehicle for operation and for transfer of the side delivery rake.

3. A side delivery rake of the type adapted to be pushed by a tractor, the combination comprising a frame, raking means attached to the frame, a guide bar attached to the frame and provided with an extending end angularly disposed with respect to the frame, a connector bar attached to the guide bar and disposed angularly thereto, an extension bar joining the frame to the connector bar, resilient means attached to the extension bar, flexible means attached to the guide bar and to the resilient means and attachable to a front portion of a tractor, and adjustable attachment means attached to the extending end of the guide bar for connection of the guide bar to the rear portion of a tractor.

4. In a push type side delivery rake for free attachment to a tractor, the combination comprising a rectangularly shaped frame, rotatably supported raking means attached to the frame, a push bar attached to the frame and adjustably and detachably connected to the rear portion of the tractor, rigid linkage means joining the push bar to the frame, a spring attached to the linkage means, flexible means attached to the spring and adjustably and detachably connected to the push bar and to the front portion of the tractor, and a plurality of caster wheels adjustably attached to the frame for support thereof.

5. In a push type side delivery rake adapted to be operated in front of a tractor and propelled behind a vehicle during transfer thereof, the combination comprising a supporting structure, raking means carried by the supporting structure, a pair of caster wheels attached to the supporting structure and adjustable along a line normal to the supporting structure, an auxiliary support leg vertically and adjustably attached to the supporting structure, a guide bar attached at one end thereof to the supporting structure, an elongate angle member attached to the other end of the guide bar and disposed normally thereto, and a clevis adjustably attached to the angle member and movable along the length thereof.

6. A "free floating" push type side delivery hay rake comprising a support structure having a plurality of frame members horizontally disposed and attached one to the other, rotatable raking means carried by the support structure, a pair of caster wheels attached to the support structure for support thereof, a vertically adjustable leg member attached to one of the frame members, the leg member being engageable with the ground for cooperation with the caster wheels for three-point support of the support structure, a guide bar attached to the support structure and extending horizontally therefrom, pivotal means for attaching the end of the guide bar to one portion of a propelling vehicle, and flexible means for loosely attaching the guide bar to another portion of the propelling vehicle.

References Cited in the file of this patent

UNITED STATES PATENTS

| | | |
|---|---|---|
| 1,104,749 | Waterman | July 21, 1914 |
| 1,745,832 | Brown | Feb. 4, 1930 |
| 2,573,971 | Hoefer | Nov. 6, 1931 |
| 2,296,065 | Slamp | Sept. 15, 1942 |
| 2,370,355 | Jones | Feb. 27, 1945 |
| 2,436,475 | Jones et al. | Feb. 24, 1948 |
| 2,531,934 | Crose | Nov. 28, 1950 |